United States Patent
Koguchi (10) Patent No.: US 6,625,678 B1
(45) Date of Patent: Sep. 23, 2003

(54) LIVELOCK AVOIDANCE METHOD

(75) Inventor: Kazuhito Koguchi, Yamanashi (JP)

(73) Assignee: NEC Corporation (JP)

(*) Notice: Subject to any disclaimer, the term of this patent is extended or adjusted under 35 U.S.C. 154(b) by 477 days.

(21) Appl. No.: 09/710,620

(22) Filed: Nov. 9, 2000

(30) Foreign Application Priority Data

Nov. 11, 1999 (JP) .......................... 11/321045

(51) Int. Cl.$^7$ ................ G06F 13/368; G06F 12/00; G06F 13/14; G06F 13/36; G06F 3/00
(52) U.S. Cl. ................ 710/120; 710/243; 710/40; 710/309; 710/240
(58) Field of Search ................ 710/40–45, 113, 710/116, 119–123, 306, 309, 311, 240–244, 120, 243

(56) References Cited

U.S. PATENT DOCUMENTS

| | | | | |
|---|---|---|---|---|
| 5,146,596 A | * | 9/1992 | Whittaker et al. | 710/116 |
| 5,706,446 A | * | 1/1998 | Kalish et al. | 710/113 |
| 5,797,020 A | * | 8/1998 | Bonella et al. | 710/240 |
| 5,933,616 A | * | 8/1999 | Pecone et al. | 710/240 |
| 6,272,580 B1 | * | 8/2001 | Stevens et al. | 710/116 |

FOREIGN PATENT DOCUMENTS

| | | |
|---|---|---|
| JP | 6-161951 | 6/1994 |
| JP | 8-221357 | 8/1996 |
| JP | 11-73397 | 3/1999 |
| JP | 11-88464 | 3/1999 |
| JP | 11-143824 | 5/1999 |
| JP | 2000-3331 | 1/2000 |

OTHER PUBLICATIONS

Japanese Office Action dated Jul. 22, 2002 (w/English translation of relevant portion).

* cited by examiner

Primary Examiner—Glenn A. Auve
Assistant Examiner—Trisha Vu
(74) Attorney, Agent, or Firm—Dickstein, Shapiro, Morin & Oshinsky, LLP.

(57) ABSTRACT

When a high-level bus converter receives a normal request from any one of a plurality of intermediate-level bus converters, the high-level bus converter converts the normal request into a retry response and sends the retry response to the intermediate-level bus converter, if a normal response buffer is busy. When the high-level bus converter receives an urgent request, the high-level bus converter sends a normal response in response to the urgent request to the intermediate-level bus converter. Each of a plurality of low-level bus converters issues a normal request, converts, when a retry response is received, the retry response into an urgent request, and reissues a request as the urgent request. When a plurality of urgent requests compete with each other for being processed, each of the plurality of intermediate-level bus converters arbitrates among the plurality of urgent requests, and directly transfers a winner urgent request to the high-level bus converter. Each of the plurality of intermediate-level bus converters converts at least one looser urgent request into a normal request and transfers the normal request to the high-level bus converter.

9 Claims, 8 Drawing Sheets

V: VALID BIT

| PRIORITY POINTER | SENDING-STATUS FLAG | | | | OUTPUT FROM URGENT REQUEST ARBITRATOR |
|---|---|---|---|---|---|
| | 3 | 2 | 1 | 0 | |
| ID=3 | 1 | X | X | X | ID=3 |
| | 0 | 1 | X | X | ID=2 |
| | 0 | 0 | 1 | X | ID=1 |
| | 0 | 0 | 0 | 1 | ID=0 |
| ID=2 | X | 1 | X | X | ID=2 |
| | X | 0 | 1 | X | ID=1 |
| | X | 0 | 0 | 1 | ID=0 |
| | 1 | 0 | 0 | 0 | ID=3 |
| ID=1 | X | X | 1 | X | ID=1 |
| | X | X | 0 | 1 | ID=0 |
| | 1 | X | 0 | 0 | ID=3 |
| | 0 | 1 | 0 | 0 | ID=2 |
| ID=0 | X | X | X | 1 | ID=0 |
| | 1 | X | X | 0 | ID=3 |
| | X | 1 | 0 | 0 | ID=2 |
| | 0 | 0 | 1 | 0 | ID=1 |

NOTE: X DENOTES "DON'T CARE"

FIG.10

| REQUEST TYPE | VALID BIT OF WINNER IDENTIFIER | SENDING STATUS FLAG | COMPARISON BETWEEN REQUEST IDENTIFIER AND WINNER IDENTIFIER | OPERATION |
|---|---|---|---|---|
| NORMAL REQUEST | NOT SUBJECT | NOT SUBJECT | NOT SUBJECT | TRANSFER NORMAL REQUEST |
| URGENT REQUEST | NOT VALID (0) | ALL NOT VALID (0) | NOT SUBJECT | TRANSFER URGENT REQUEST SET VALID BIT OF WINNER IDENTIFIER VALID |
| URGENT REQUEST | NOT VALID (0) | ONE VALID (1) | COINCIDE WITH OUTPUT OF URGENT REQUEST ARBITRATOR | TRANSFER URGENT REQUEST SET VALID BIT OF WINNER IDENTIFIER VALID |
| URGENT REQUEST | NOT VALID (0) | ONE VALID (1) | NOT COINCIDE WITH OUTPUT OF URGENT REQUEST ARBITRATOR | TRANSFER NORMAL REQUEST SET VALID BIT OF WINNER IDENTIFIER VALID |
| URGENT REQUEST | VALID (1) | NOT SUBJECT | COINCIDE WITH OUTPUT OF URGENT REQUEST ARBITRATOR | TRANSFER URGENT REQUEST LEAVE VALID BIT OF WINNER IDENTIFIER VALID |
| URGENT REQUEST | VALID (1) | NOT SUBJECT | NOT COINCIDE WITH OUTPUT OF URGENT REQUEST ARBITRATOR | TRANSFER NORMAL REQUEST LEAVE VALID BIT OF WINNER IDENTIFIER VALID |

FIG.11

LIVELOCK AVOIDANCE METHOD

BACKGROUND OF THE INVENTION

1. Field of the Invention

The present invention relates to a livelock avoidance method, and, more particularly, to a livelock avoidance method in a data processing apparatus, which comprises a plurality of bus converters connected with each other in hierarchy and retries a request to be executed.

2. Description of the Related Art

The ordering standard of "Any normal response following a preceding write request without any preceding response must not go ahead of the preceding write request" is outlined in the PC1 bus standard. In order to keep up this ordering standard, the normal response should not be executed prior to the write request.

In a data processing apparatus including a plurality of bus converters which are connected with each other in hierarchy, in a case where a normal request buffer or a normal response buffer is busy in a bus converter, deadlock may possibly occur as a result of a violation in the ordering standard.

In prior art, in order to avoid the occurrence of any deadlock situation, in, a case where a normal response buffer is busy, the bus converter converts a request into a retry response, and sends the retry response to a bus converter having issued the request.

In a case where a request is converted into a retry response and transmitted to the converter having issued the request, the request may be repeatedly retried. Hence, a livelock situation "where the transaction is not processed for a long time or forever so that the transaction is suspended" may possibly occur.

In the above prior art, if the livelock situation occurs, the converter having issued the request detects a "retry-count overflow" error, and a system fault of the data processing apparatus occurs.

In Unexamined Japanese Patent Application KOKAI Publication No. H11-73397. there is disclosed a technique for preventing any livelock situation in a round robin circuit. This technique can not suitably be employed in a data processing apparatus comprising a plurality of bus converters connected with each other in hierarchy.

In Unexamined Japanese Patent Application KOKAI Publication No. H11-143824, there is disclosed a technique for eliminating livelock, by arbitrating among bus requests of the entire bus agents and determining one bus master, if the bus agents are in an idle state. However, this technique is prepared for arbitrating among only some of the entire bus agents, but not for arbitrating among the entire bus agents in its entirety, and can not suitably be employed in a data processing apparatus comprising a plurality of bus converters connected with each other in hierarchy. The contents of these references are incorporated into this specification.

SUMMARY OF THE INVENTION

The present invention has been made in consideration of the above facts. It is accordingly an object of the present invention to provide a livelock avoidance method for reliably processing a retried request and avoiding occurrence of a system fault, and a data processing apparatus realizing the livelock avoidance method.

Another object thereof is to provide, in a data processing apparatus comprising a plurality of bus conveners connected with each other in hierarchy, a livelock avoidance method for reliably processing a retry request and avoiding occurrence of a system fault, and the data processing apparatus realizing the livelock avoidance method.

The order to accomplish the above objects, according to the first aspect of the present invention, there is provided a data processing apparatus comprising at least one high-level bus converter, a plurality of intermediate-level bus converters, and a plurality of low-level bus converters which are connected with one another in hierarchy, wherein:

said at least one high-level bus converter converts, if a normal-response buffer is busy when a normal request is received, the received normal request into a retry response and sends the retry response to one of said plurality of intermediate-level bus converters which has sent the normal request thereto, and sends, when an urgent request is received, a normal response in response to the received urgent request to one of said plurality of intermediate-level bus converters which has sent the urgent request thereto;

each of said plurality of low-level bus converters issues a normal request, and converts, when a retry response is received, the retry response into an urgent request, and reissues a request as the urgent request; and each of said plurality of intermediate-level bus converters arbitrates, when a plurality of urgent requests compete with each other, between the plurality of urgent requests and transfers a winner urgent request to said at least one high-level bus converter, converts at least one looser urgent request into a normal request, and transfers the looser urgent request to said at least one high-level bus converter.

According to the second aspect of the present invention, there is provided a livelock avoidance method, as a data processing method carried out by a data processing apparatus comprising a plurality of bus converters connected with each other in hierarchy, said method comprising:

converting, in a bus converter having received a normal request, the normal request into a retry response, when a normal response buffer is busy, and sending the retry response to a bus converter, having issued the normal request, through reserved-response entry;

reissuing a request as an urgent request for requesting an urgent service based on the retry response in the bus converter having issued the normal request; and arbitrating, when a plurality of urgent requests compete with each other in a bus converter arranged in a request path, between the plurality of urgent requests, transferring a winner urgent request to a high-level bus converter, and transferring at least one looser urgent request to the high-level bus converter as a normal request.

According to the third aspect of the present invention, there is provided a method for processing data as performed by a data processing apparatus comprising at least one high-level bus converter, a plurality of intermediate-level bus converters and a plurality of low-level bus converters which are connected with each other in hierarchy, wherein:

said high-level bus converter converts, if a normal-response buffer is busy when a normal request is received, the received normal request in a retry response and sends the retry response to one of said plurality of intermediate-level bus converters which has sent the normal request thereto, and sends, when an urgent request is received, a normal response in response to the received urgent request to one of said plurality of intermediate-level bus converters which has sent the urgent request thereto;

each of said plurality of low-level bus converters issues a normal request, and converts, when a retry response is received, the retry response into an urgent request, and reissues a request as an urgent request; and each of said plurality of intermediate-level bus converters arbitrates, when a plurality of urgent requests compete with each other, between the plurality of urgent requests and transfers a winner urgent request to said high-level bus converter, converts a looser urgent request into a normal request, and transfers the looser urgent request to the high-level bus converter.

According to the fourth aspect of the present invention, there is provided a data processing apparatus comprising at least one high-level bus converter, a plurality of intermediate-level converters and a plurality of low-level bus converters which are connected with each other in hierarchy, wherein:

said high-level bus converter includes means for converting, if a normal-response buffer is busy when a normal request is received, the received normal request into a retry response and sends the retry response to one of said plurality of intermediate-level bus converters which has sent the normal request thereto, and means for sending, when an urgent request is received, a normal response in response to the received urgent request to one of said plurality of intermediate-level bus converters which has sent the urgent request thereto;

each of said plurality of low-level bus converters includes means for issuing a normal request, and means for converting, when a retry response is received, the retry response into an urgent request, and reissues a request as an urgent request; and each of said plurality of intermediate-level bus converters includes means for arbitrating, when a plurality of urgent requests compete with each other, between the plurality of urgent requests and transfers a winner urgent request to said high-level bus converter, converts a looser urgent request into a normal request, and transfers the looser urgent request to the high-level bus converter.

According to the fifth aspect of the present invention, there is provided a bus converter for an intermediate-level in a hierarchy in a data processing apparatus comprising at least one high-level bus converter, a plurality of intermediate-level bus converters and a plurality of low-level bus converters which are connected with each other in the hierarchy, wherein said bus converter receives an urgent request in a request buffer, arbitrates, when a plurality of urgent requests compete with each other, between the plurality of urgent requests and transfers a winner urgent request to said high-level bus converter, transfers at least one looser urgent request into a normal request, and transfers the normal request to said high-level bus converter.

BRIEF DESCRIPTION OF THE DRAWINGS

These objects and other objects and advantages of the present invention still become more apparent upon reading of the following detailed description and the accompanying drawings in which.

DETAILED DESCRIPTION OF THE PREFERRED EMBODIMENT

A preferred embodiment of the present invention will now be explained with reference to the accompanying drawings.

Figure 1:
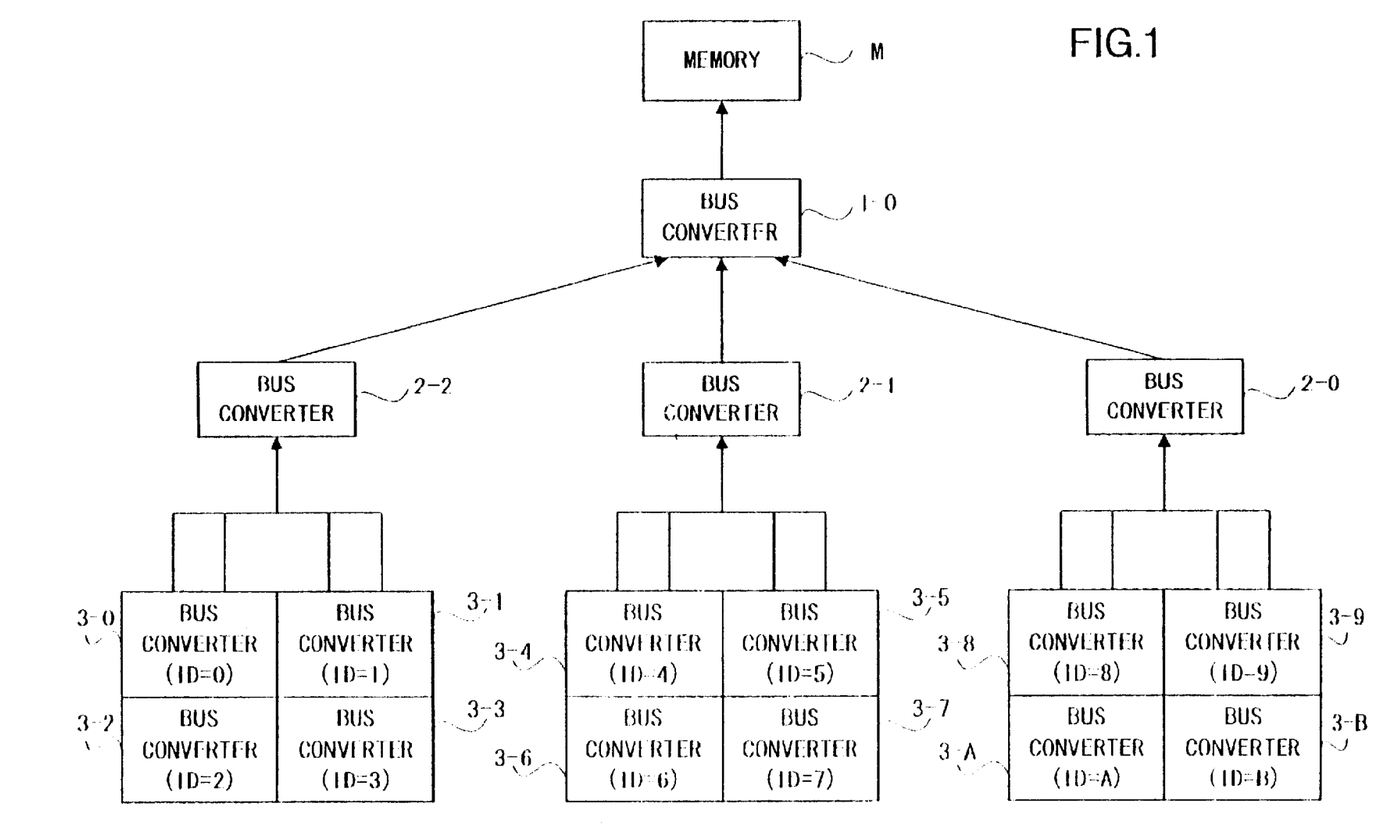
FIG. 1 is a block diagram showing the entire structure of a data processing apparatus which employs a livelock avoidance method according to an embodiment of the present invention.

FIG. 1 is a block diagram showing the entire structure of a data processing apparatus which employs a livelock avoidance method according to the embodiment of the present invention.

The data processing apparatus comprises: a memory M which stores data; a bus converter (hereinafter referred co as a high-level bus converter) 1-0 which is connected to the memory M and transfers a request to the memory M; three bus converters (hereinafter referred to as intermediate-level bus converters) 2-2, 2-1 and 2-0 which are connected to the high-level bus converter 1-0 and issue a request thereto; four bus converters (hereinafter referred to as low-level converters) 3-0, 3-1, 3-2 and 3-3 which are connected to the intermediate-level bus converter 2-2 and issue a request thereto; four bus converters Thereinafter referred to as low-level converters) 34, 3-5, 3-6 and 3-7 which are connected to the intermediate-level bus converter 2-1 and issue a request thereto; and four bus converters (hereinafter referred to as low-level converters) 3-8, 3-9, 3-A and 3-B which are connected to the intermediate-level bus converter 2-0 and issue a request thereto.

Figure 2:
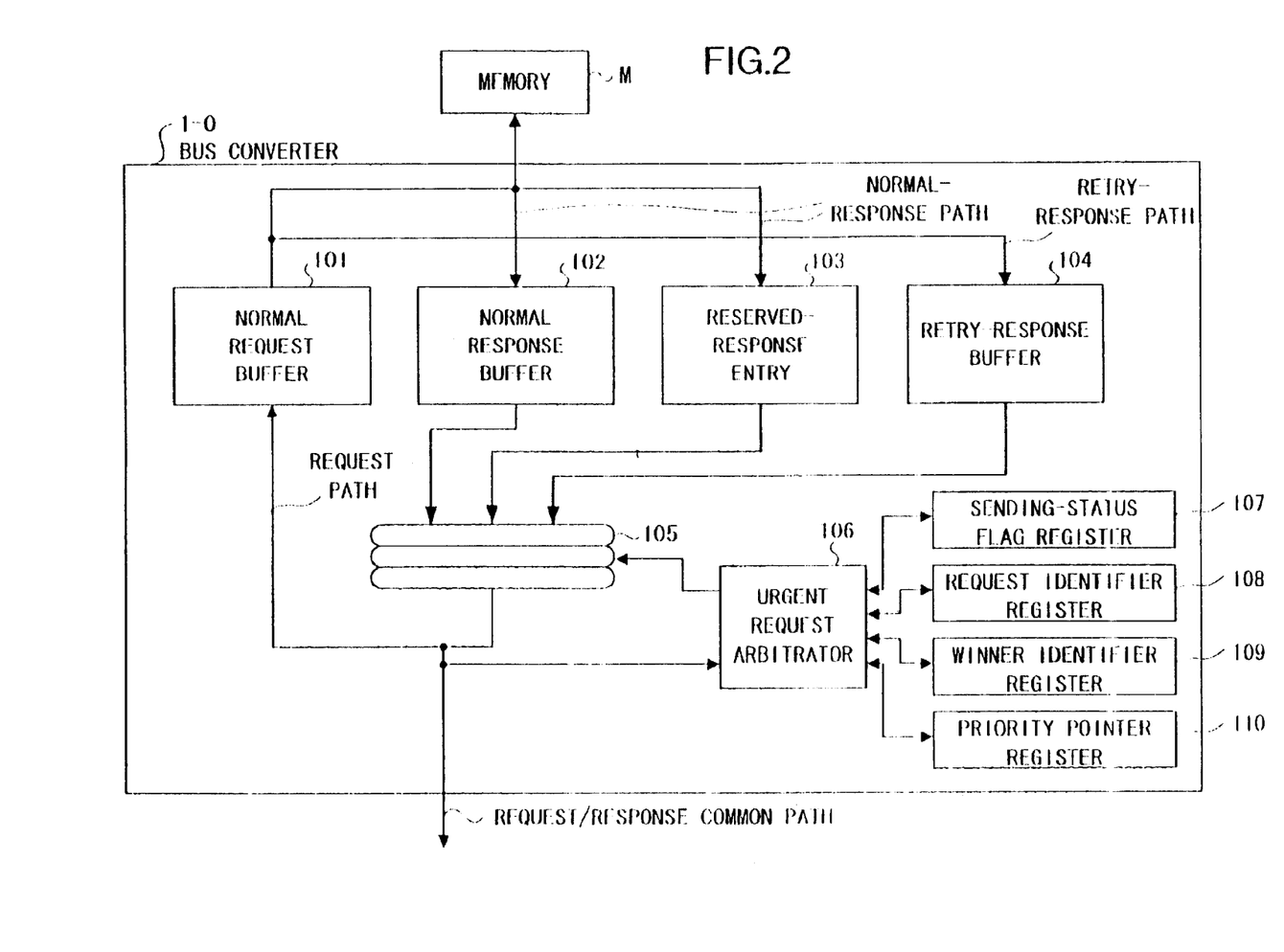
FIG. 2 is a block diagram specifically showing the structure of a bus converter at a high level in hierarchy shown in FIG. 1.

As shown in FIG. 2, the high-level bus converter 1-0 includes a normal-request buffer 101, a normal-response buffer 102, reserved-response entry 103, a retry-response buffer 104, a connector 105, an urgent request arbitrator 106, a sending-status flag register 107, a request identifier register 108, a winner identifier register 109, and a priority pointer register 110.

The normal-request buffer 101 stores normal requests sent respectively from the intermediate-level bus converters 2-2, 2-1, and 2-0.

The normal-response buffer 102 sends, to the intermediate-level bus converters 2-2, 2-1 and 2-0, normal responses in response to the normal requests transferred therefrom.

In a case where the retry-response buffer 104 cannot execute normal a request transferred from any of the intermediate-level bus converters 2-2, 2-1 and 2-0, it sends a retry response thereto. If the normal-response buffer 102 is busy, the high-level bus converter 1-0 converts a request from any of the low-level bus converters 3-0 to 3-B into a retry response, and sends the retry response thereto through the retry-response buffer 104. In order to avoid the occurrence of a deadlock situation where, two or more of the low-level bus converters 3-0 to 3-B having sent the requests are prevented from continuing a process while waiting for a response, normal-response paths and a retry-response path are separately prepared in the high-level bus converter 1-0, and the units for busy management are prepared respectively therefor. In each normal response and retry response, there is retained a bus converter identifier (hereinafter referred to as a request identifier), as is. Such a bus converter identifier corresponds to one of the low-level bus converters 3-0 to 3-B which has sent a request and, is affixed to the request.

The connector 105 transfers outputs respectively from the normal-response buffer 102, the reserved-response entry 103 and the retry-response buffer 104 to the intermediate-level bus conveners 2-2, 2-1 and 2-0.

The urgent request arbitrator 106, the sending-status flag register 107, the request identifier register 108, the winner identifier register 109 and the priority pointer register 110, which are all included in the high-level bus converter 1-0, will be described in more detail later.

Figure 3:
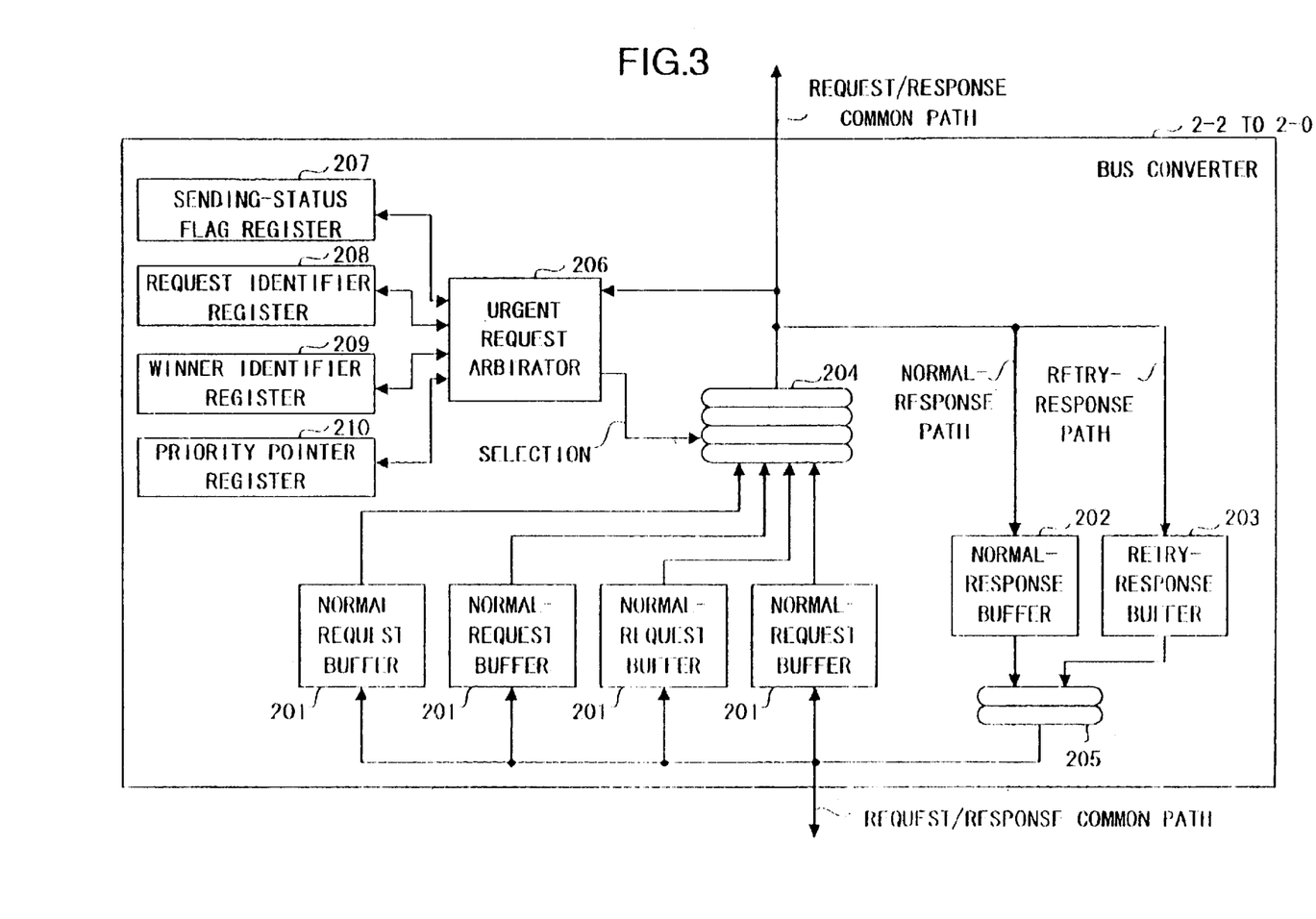
FIG. 3 is a block diagram specifically showing the structure of a bus converter at an intermediate level in hierarchy shown in FIG. 1.

As shown in FIG. 3, each of the intermediate-level bus converters 2-2, 2-1 and 2-0 includes: the number of normal-request buffers 201 which corresponds the number of low-level bus converters connected thereto (i.e., four of the bus converters in the illustration); a normal-response buffer 202; a retry-response buffer 203; a selector 204; a connector 205; an urgent request arbitrator 206; a sending-status flag register 207; a request identifier register 208; a winner identifier register 209; and a priority pointer register 210.

Figure 4:
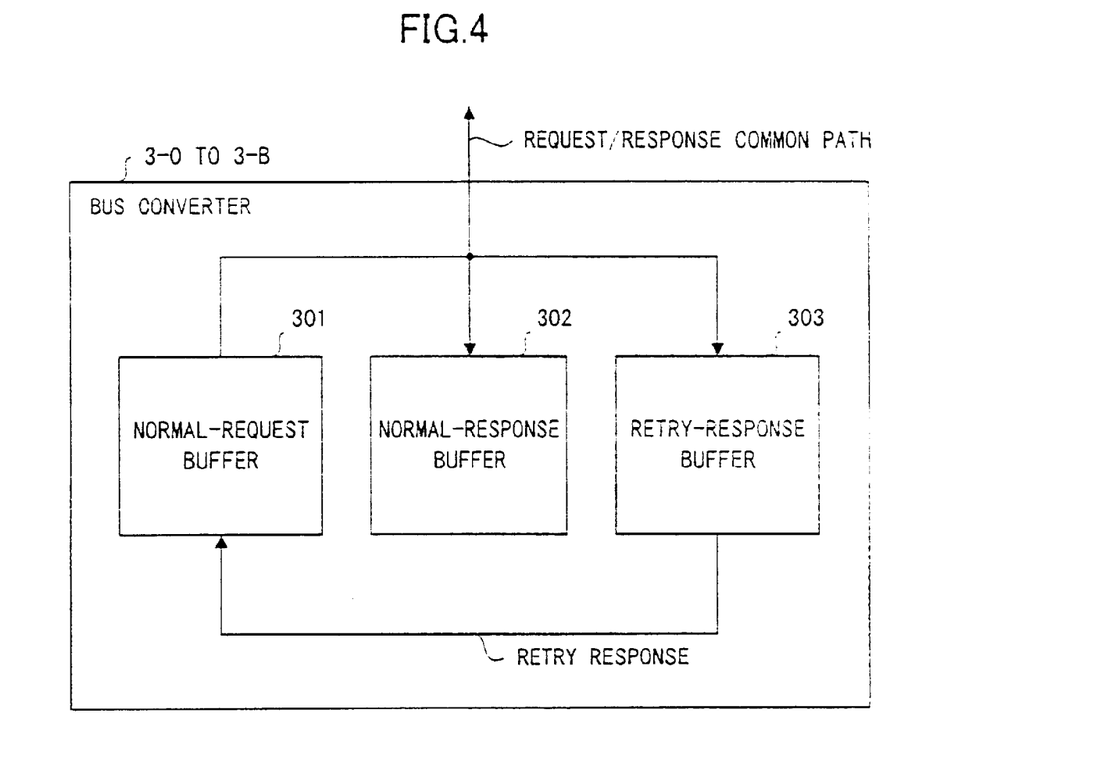
FIG. 4 is a block diagram specifically showing the structure of a bus converter at a low level in hierarchy shown in FIG. 1.

As illustrated in FIG. 4, each of the low-level bus converters 3-0 to 3-B includes a normal-request buffer 301, a normal-response buffer 302, and a retry-response buffer 303. Each of the low-level bus converters 3-0 to 3-B issues a request to which a request identifier for identifying the request is fixed. Upon reception of a retry response in the retry-response buffer 303, each of the low-level bus converters 3-0 to 3-B converts the retry-response into an urgent request, and issues a request as the urgent request through the normal-request buffer 301. Note that the urgent request is a request having request information (such as address, command, data, etc.) originally included in the normal request, and a flag representing that a service is urgently required (i.e., a normal response is required to be sent).

Figure 5:
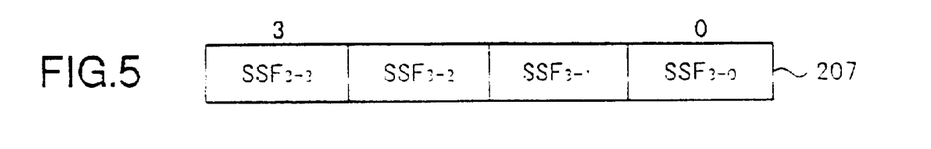
FIG. 5 is a diagram exemplifying the contents of a sending-status flag register shown in FIG. 3.

FIG. 5 is a diagram showings the contents of the sending-status flag register 207, as one included in the intermediate-level bus converter 2-2 by way of example. The sending-status flag register 207 is a register storing a flag (hereinafter referred to as a sending-status flag) representing that the intermediate-level bus converter 2-2 is in the middle of a process for successfully transferring an urgent request as an urgent request or as a normal request to the high-level bus converter 1-0. In FIG. 5 the sending-status flag register 207 is a register of four bits. Those four bits include sending-status flags SSF3-0, SSF3-1, SSF3-2 and SSF3-3 respectively corresponding to the low-level bus converters 3-0, 3-1, 3-2 and 3-3 which are connected to the intermediate-level bus converter 2-2. The condition or setting each of the set status flags SSF3-0, SSF3-1, SSF3-2, and SSF3-3 active is fulfilled, by the intermediate-level bus converter 2-2 receiving an urgent request issued by a corresponding one of the low-level bus converters 3-0, 3-1, 3-2 and 3-3, and transferring the received request as an urgent request or as a normal request to the high-level bus converter 1-0. The condition for resetting each of the set status flags SSF3-0, SSF3-1, SSF3-2, and SSF3-3 is fulfilled when a corresponding one of the low-level bus converters 3-0, 3-1, 3-2, and 3-3 receives a normal response (which can be identified with its attached request identifier), in response to the transferred request while a corresponding flag is set active. Any of the sending-status flags is not reset, even a retry response is sent in response to the request which is transferred while a corresponding flag is set active. The intermediate-level bus converter 2-1 includes a sending-status resister storing sending-status flag SSF3-4 to SSF3-7, the intermediate-level bus converter 2-0 includes a sending-status register storing sending-status flags SSF3-8 to SSF3-B, and the high-level bus converter 1-0 includes a sending-status register store sending-status flags SSF2-0 to SSF2-2, within the sending-status flag register 107.

Figure 6:
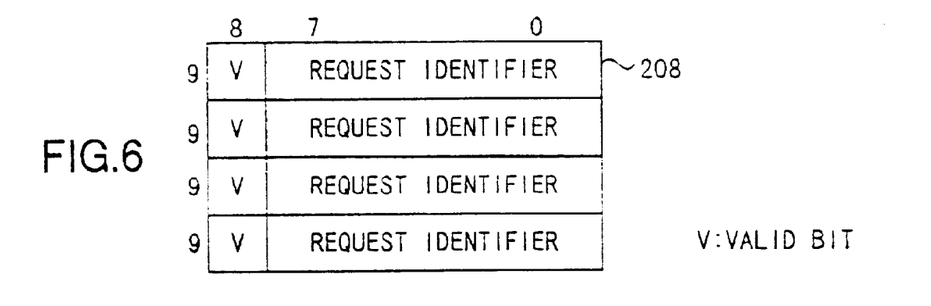
FIG. 6 is a diagram exemplifying the contents of a request identifier register shown in FIG. 3.

FIG. 6 is a diagram showing the contents of the request identifier register 208, as one included in the intermediate-level bus converter 2-2 by way of example.

The request identifier register 208 is composed of four registers respectively corresponding to the low-level bus converters 3-0, 3-1, 3-2 and 3-3.

Each of the registers in the request identifier register 208 is a nine-bit register, wherein the valid bit is stored in the most significant bit and a request identifier is stored in the eight least significant bits.

The request identifier stored in each register of the request identifier register 208 is used for identifying, when to reset a target sending-status flag SSF, the target sending-status flag SSF in the sending-status flag register 207.

The condition for setting the valid bit in each register of the request identifier register 208 is fulfilled by the intermediate-level bus converter 202 receiving an urgent request issued from any of the low-level bus converters 3-0, 3-1, 3-2 and 3-3, and transferring the received request as an urgent request or as a normal request. The condition for resetting the valid bit of each register in the request identifier register 208 is fulfilled by the intermediate-level bus converter 2-2 receiving, from the high-level bus converter 1-0, a normal response or a retry response with a request identifier corresponding to a request identifier stored in each register of the request identifier register 208. A register having the same function as that of the request identifier register 208 is included also in each of the intermediate-level bus converters 2-1 and 2-0. Note that the high-level bus converter 1-0 shown in FIG. 2 includes the request identifier register 1-8, as described above.

Figure 7:
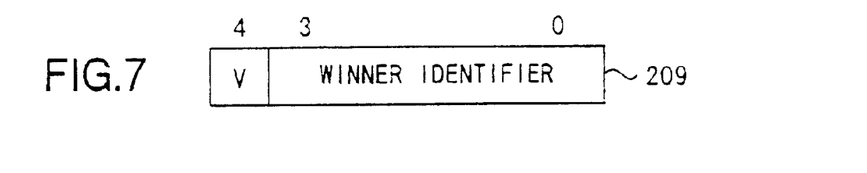
FIG. 7 is a diagram exemplifying the contents of a winner identifier register shown in FIG. 3.

FIG. 7 is a diagram showing the contents of the winner identifier register 209, as one included in the intermediate-level bus converter 2-2, by way of example. The winner identifier register 209 is a register of four bits, and stores the valid bit in the most significant bit and a request identifier of an urgent request in the three least significant bits. The request identifier of the urgent request is one for identifying a winner request which has been determined as a winner in the urgent request arbitrator 206. In the case where the valid bit in the winner identifier register 209 is valid and the winner identifier coincides with the request identifier of the urgent request, the intermediate-level bus converter 2-2 transfers the urgent request as is to the high-level bus converter 1-0.

On the contrary, in the case where the valid bit in the winner identifier register 209 is valid and the winner identifier does not coincide with the request identifier of the urgent request, the urgent request is in the middle of the process of being successfully executed. In this case, the intermediate-level bus converter 2-2 can not transfer, to the high-level bus converter 1-0, the urgent request which is received from the low-level bus converters 3-0 to 3-3, as an urgent request as is. Hence, the intermediate-level bus converter 2-2 converts the urgent request into a normal request and transfers the normal request to the high-level bus converter 1-0.

The condition for setting the valid bit in the winner identifier register 209 is fulfilled by transferring a winner urgent request to the high-level bus converter 1-0. The condition for resetting the valid bit in the winner register 209 is fulfilled when the winner identifier in the winner identifier register 209 coincides with the request identifier of the normal response sent from the high-level bus converter 1-0. A register having the same function as that of the winner identifier register 209 is also include in the intermediate-level bus converters 201 and 2-0. The high-level bus converter 1-0 shown in FIG. 2 includes the winner identifier register 109 as described above.

Figure 8:
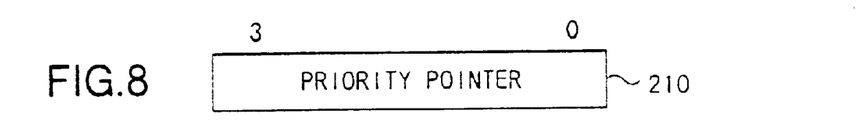
FIG. 8 is a diaper exemplifying the contents of a priority register shown in FIG. 3.

FIG. 8 is a diagram showing the contents of the priority pointer register 210, as one included in the intermediate-level bus converter 2-2 by way of example. The priority pointer register 210 is a register of four bits, and stores a request identifier as a priority pointer of a winner which has been determined as a winner as a result of arbitration between urgent requests. The priority pointer of the priority pointer register 210 is counted up every time an urgent request is transferred. A register having the same function as that of the priority pointer register 210 is included in the intermediate-level bus converters 2-1 and 2-0. The high-level bus converter shown in FIG. 2 includes the priority pointer register 110.

Figure 9:
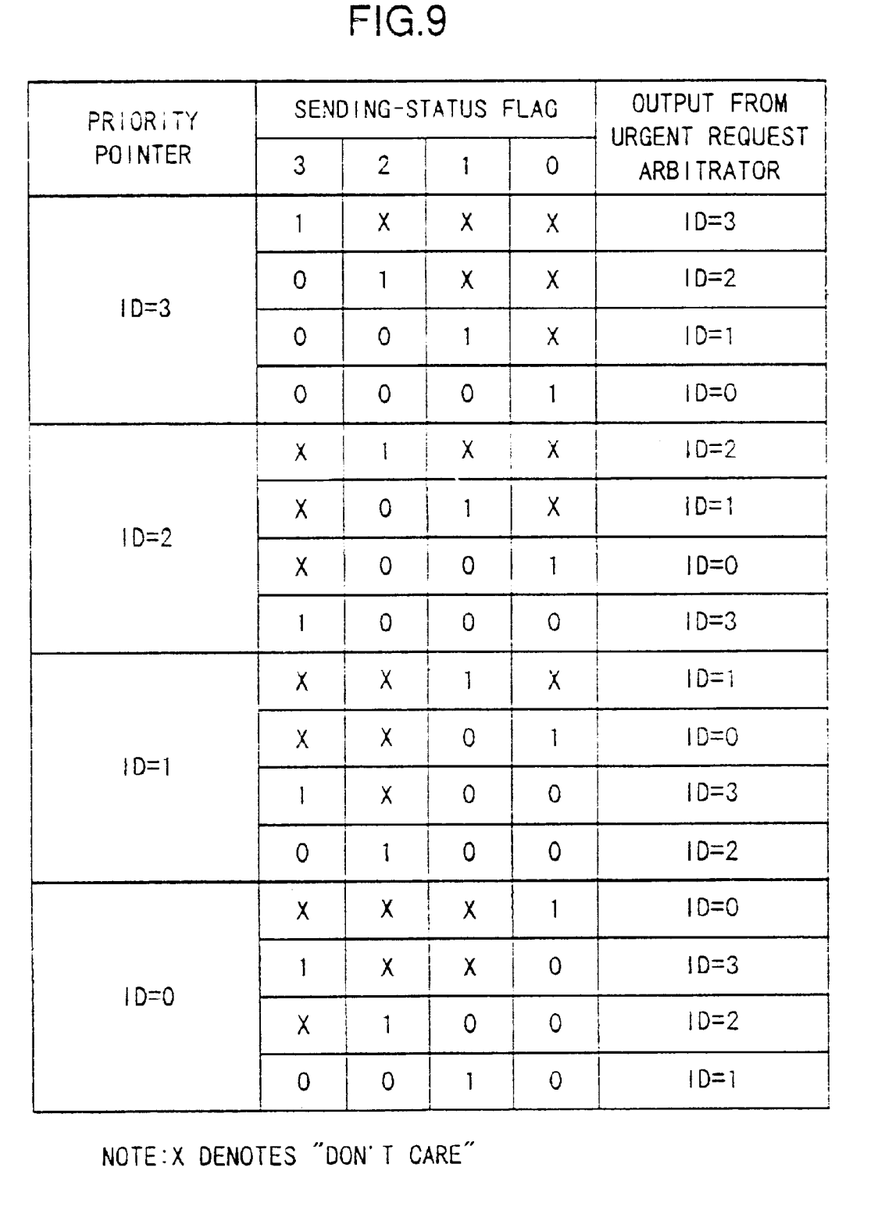
FIG. 9 is a diagram showing an example of arbitration logic processed in an urgent request arbitrator shown in FIG. 3.

FIG. 9 illustrates arbitration logic for determining a winner in the urgent request arbitrator 209, as carried out in the intermediate-level bus converter 202 by way of example.

Upon reception of an urgent request from any one of the low-level bus converters 3-0 to 303, the urgent request arbitrator 206 arbitrates between the urgent request and an urgent request from one of the low-level bus converters 3-0 to 3-3, corresponding to a valid (set) flag of the sending-status flags SSF3-0 to SSF3-3.

Input into the urgent request arbitrator 206 are a request identifier of the received urgent request and a bus converter identifier of one low-level bus converter corresponding to the valid sending-status flag.

Note that the intermediate-level bus converter 2-2 does not necessarily retain the urgent request from one low-level bus converter corresponding to the valid-set sending status flag among the sending-status flag SSF3-0 to SSF3-3. The urgent request once sent to the high-level bus converter 1-0 might have been sent back to one of the low-level bus converters 3-0 to 3-3 having issued the request, in the form of a retry response from the high-level bus converter 1-0.

Therefore, the urgent request to be arbitrated sets a corresponding one of the sending-status flags SSF3-0 to SSF3-3 valid, and arbitrated with another urgent request to be reissued. An urgent request arbitrator having the same function as that of the urgent request arbitrator 206 is included also in the intermediate-level bus converters 2-1 and 2-0. The high-level bus converter 1-0 shown in FIG. 2 includes an urgent request arbitrator 1-6.

Figure 10:
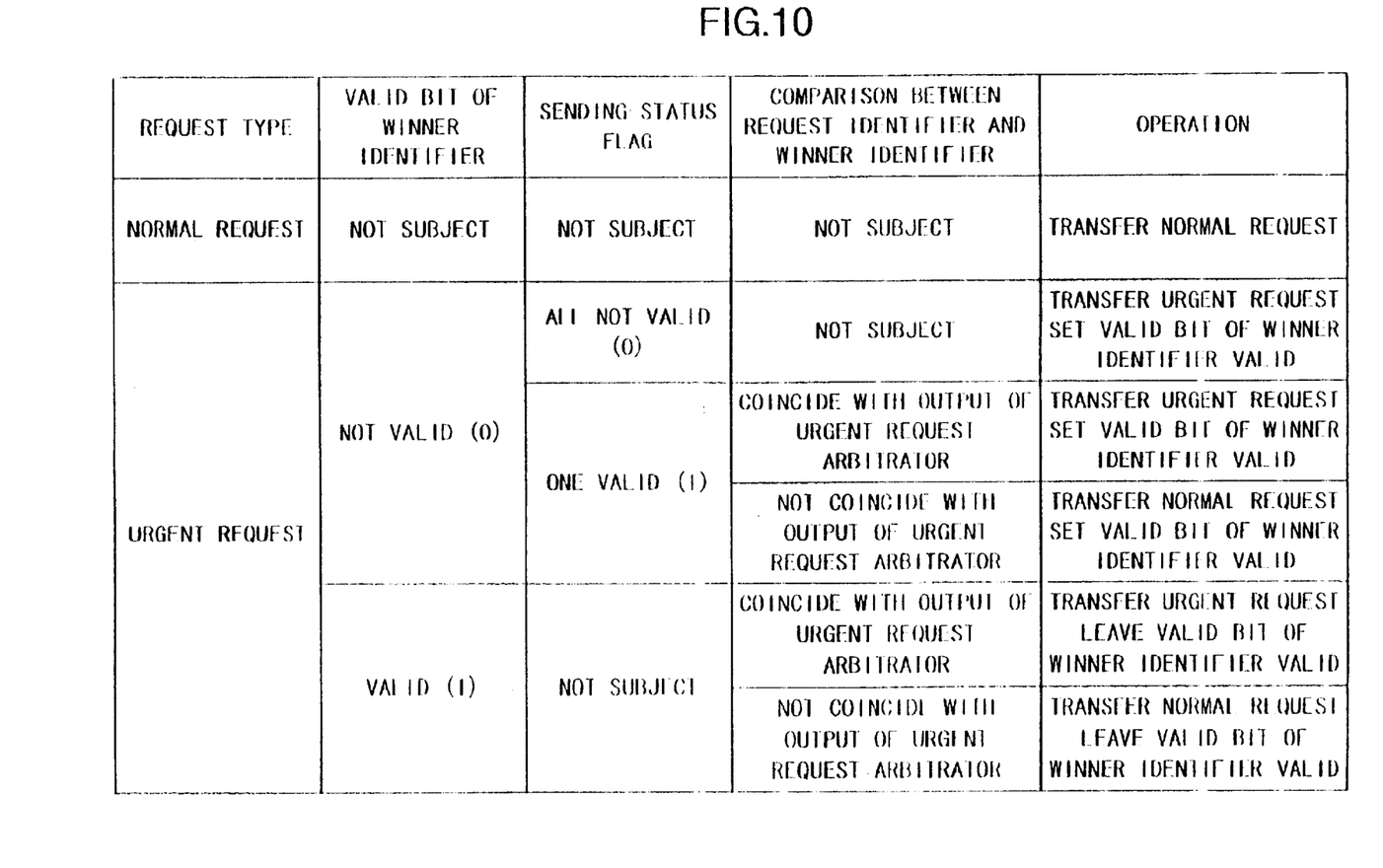
FIG. 10 is a diagram showing the relationship among the state of a valid bit in a winner identifier register, the state of a sending-status flag, a comparison between a request identifier and a winner identifier, and an operation of the bus converter at the intermediate level.

FIG. 10 is a diagram showing the relationship among the state of the valid bit in the winner identifier register 209, the state of the sending-status flags SSF3-0 to SSF3-3, a comparison between a request identifier and a winner identifier, and an operation of the intermediate-level bus converter 2-2.

Operations of the data processing apparatus which employs the livelock avoidance method according to the embodiment of the present invention will now specifically be explained. Explanations will be made to a case where a normal request is issued from the bus converter 3-0, by way of example.

The low-level bus converter 3-0 issues a normal request through the normal request buffer 301.

The Intermediate-level bus converter 2-2 receives an issued normal request in one of the normal request buffers 201 corresponding to the low-level bus converter 3-0. The intermediate-level bus converter 2-2 directly transfers the normal request to the high-level bus converter 1-0 through the selector 204 (refer to FIG. 10). At this time, the urgent request arbitrator 206 does not set the valid bit in the winner identifier register 209.

The high-level bus converter 1-0 receives the normal request in the normal request buffer 101. The high-level bus converter 1-0 transfers the received normal request to the memory M, unless the normal response buffer 102 is busy.

On the contrary, if the normal response buffer 102 is busy, the high-level bus converter 1-0 converts the normal request into a retry response and sends the retry response to the intermediate-level bus convener 2-2 through the retry-response buffer 104, so that the occurrence of a deadlock situation is prevented.

Upon reception of the retry response in the retry-response buffer 203, the intermediate-level bus converter 2-2 transfers the retry response to the low-level bus converter 3-0 through the connector 205. At this time, the urgent request arbitrator 206 does not reset the valid bid in the winner identifier register 209.

The low-level bus converter 3-0 receives the retry response in the retry-response buffer 303. After this, the low-level bus converter 3-0 retrieves the retry response from the retry-response buffer 303, converts the retrieved retry response into an urgent request, and reissues a request as an urgent request through the normal request buffer 301.

The intermediate-level bus converter 2-2 receives the urgent request from the low-level bus converter 30 in the normal request buffer 201. Then, the urgent request arbitrator 206 arbitrates among a plurality of urgent requests, determines only one winner among the plurality of urgent requests, and transfers the winner urgent request to the high-level bus converter 1-0. The intermediate-level bus converter 2-2 converts the other (or the rest of) urgent request(s) which is determine as a looser(s) as a result of the arbitration into a normal request(s), and transfers the normal request(s) to the high-level bus converter 1-0. For the next arbitration, the urgent request arbitrator 206 cyclically counts up, by one in a range between 0 to 3, the priority pointer in the priority pointer register 210 so that the next-coming winner among the low-level bus converters 3-0 to 3-3 can be determined.

In more particular, in the case where the valid bit in the winner identifier register 209 is not valid, i.e. "0", and the entire sending-status flags SSF3-0 to SSF3-3 are all not valid. i.e., "0", the urgent request arbitrator 206 determines the received urgent request as a winner request, and directly transfers the urgent request to the high-level bus converter 1-0 (refer to FIG. 10). At this time, the urgent request arbitrator 206 stores a request identifier of the winner urgent request as a winner identifier in the winner identifier resister 209, and sets its corresponding valid bit valid.

In the case where the valid bit in the winner identifier resister 209 is not valid, i.e. "0", and any one of the sending-status flags SSF3-1 to SSF3-3 is valid, i.e., "1", and also where the request identifier of the received urgent request coincides with the identifier output by the urgent request arbitrator 206, the intermediate-level bus converter 2-2 determines the urgent request as a winner request and sends the urgent request to the high-level bus converter 1-0. On the contrary, in the case where the request identifier of the received urgent request does not coincide with the identifier output by the urgent request arbitrator 206, the intermediate-level bus converter 2-2 determines the received urgent request as a looser request, converts the urgent request into a normal request, and transfers the normal request to the which-level bus converter 1-0. At this time, the urgent request arbitrator 206 leaves the valid bit in the winner identifier register 209 as a non-valid bit.

For example, in the case where the priority pointer of the priority pointer register 210 is 3 (ID=3) and the sending-status flag SSF3-3 is valid, and also where the rest of the flags of the sending-status flags SSF3-2, SSF3-1 and SSF3-0 are all not valid, the urgent request arbitrator 206 outputs "ID=3" in accordance with the arbitration logic described in FIG. 9. Thus, the intermediate-level bus converter 2-1 determines the urgent request issued from the low-level bus converter 3-3 as a winner urgent request, and transfers the winner urgent request to the high-level bus converter 1-0. In this case, the urgent request issued from the low-level bus converter 3-0 is determined as a looser request, the intermediate-level bus converter 2-2 converts the urgent request into a normal request, and transfers the normal request to the high-level bus converter 1-0.

Furthermore, in the case where the valid bit in the winner identifier register 209 is valid and the request identifier of the received urgent request coincides with the winner identifier of the winner identifier register 209, the intermediate-level bus converter 2-2 transfers the received urgent request is a winner request to the high-level bus converter 1-0. On the contrary, in the case where the request identifier of the received urgent request does not coincide with the identifier output by the urgent request arbitrator 206, the intermediate-level bus converter 2-2 determines the urgent request as a looser request, converts the urgent request into a normal request, and transfers the normal request to the high-level bus converter 1-0. At this time, the urgent request arbitrator 206 leaves the valid bit of the winner identifier register 209 as a non-valid bit.

Figure 11:
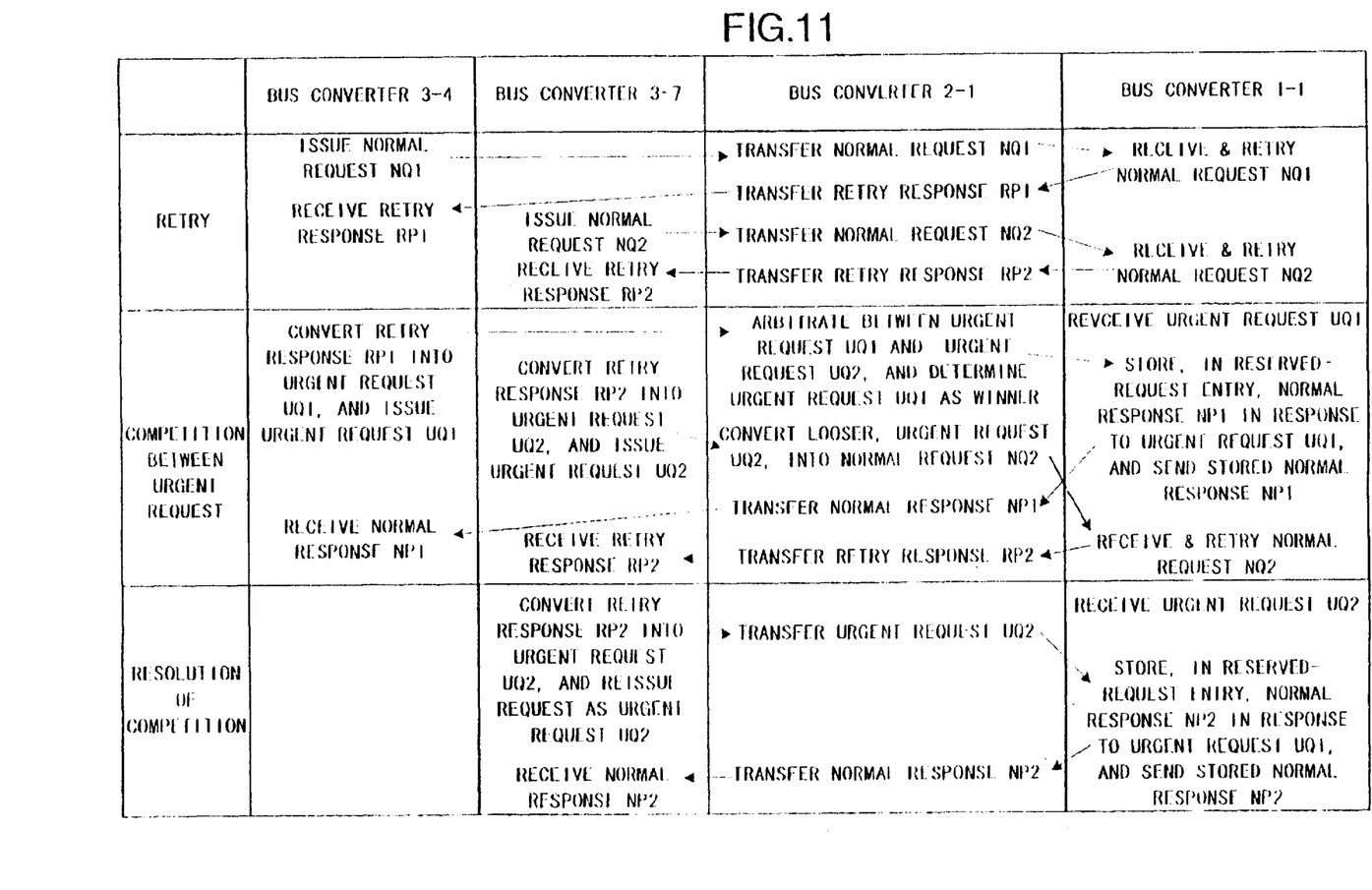
FIG. 11 is a flow diagram showing the flow of a request processed in accordance with the livelock avoidance method according to the embodiment of the present invention.

The flow of a request processed in the above-described system will now be explained with reference to the flow diagram shown in FIG. 11. Such explanations will be made to the case where a normal request NQ1 is issued from the bus convener 3-4 and a normal request NQ2 is issued from the bus converter 3-7, by way of example.

When the low-level bus converter 34 issues the normal request NQ1, the intermediate-level bus converter 2-1 transfers the normal request NQ1 to the high-level bus converter 1-0.

Upon reception of the normal request NQ1, the high-level bus converter 1-0 converts the normal request NQ1 into a retry response RP1 and sends the response RP1 to the intermediate-level bus converter 2-1, if the normal-response buffer 1-2 is busy.

Upon reception of the retry response RP1, the intermediate-level bus convener 2-1 sends the retry response RP1 to the low-level bus converter 3-4 having issued the request.

Then, the low-level bus converter 34 receives the retry response RP1.

After the low-level bus converter 3-7 issues the normal request NQ2, the intermediate-level bus converter 2-1 transfers the normal request NQ2 to the high-level bus converter 1-0.

Upon reception of the normal request NQ2, the high-level bus converter 1-0 converts the normal request NQ2 into a retry response RP2 and sends the retry response RP2 to the intermediate-level bus converter 2-1, if the normal-response buffer 102 is busy.

Upon reception of the retry response RP2, the intermediate-level bus converter 2-1 sends the retry response RP2 to the low-level bus converter 3-7 having issued the request.

Then, the low-level bus converter 3-7 receives the retry response RP1.

The low-level bus converter 34 converts the retry response RP1 into an urgent request UQ1, and reissues a request as the urgent request UQ1.

Upon reception of the retry response RP2, the low-level bus converter 3-7 converts the retry response RP2 into an urgent request UQ2 and reissues a request as the urgent request UQ2.

When the intermediate-level bus converter 2-1 receives the urgent request UQ1, the urgent request arbitrator 206 determines the urgent request UQ1 as a winner request, since the valid bit of the winner identifier in the winner identifier register 209 is not valid and the sending-status flags SSF3-4 to SSF3-7 are not valid. Hence the intermediate-level bus converter 2-1 directly transfers the urgent request to the high-level bus converter 1-0 (refer to FIG. 10). At this time, the urgent request arbitrator 206 determines the request identifier (ID=4) of the urgent request UQ1 as a winner identifier, stores the identifiers in the winner identifier register 209, and sets the valid bit in the winner identifier register 209 valid. The urgent request arbitrator 2-6 sets the sending-status has SSF3-4 valid in the sending-status flag register 207.

When the intermediate-level bus converter 2-1 receives the urgent request UQ2, the urgent request arbitrator 206 outputs (ID=4), since the valid bit of the winner identifier register 209 is valid and the sending-status flag SSF3-4 is valid (i.e., the urgent request UQ1 is in the middle of the process of successfully being executed) (refer to FIG. 10). The urgent request arbitrator 206 determines the urgent request UQ2, since the output identifier "ID=4" drifts from the request identifier "ID=7" of the urgent request UQ2. Thus, the intermediate-level bus converter 2-1 converts the urgent request UQ2 into a normal request NQ2, and transfers the normal request NQ2 to the high-level bus converter 1-0. At this time, the urgent request arbitrator 206 does not change the winner identifier (ID=4) stored in the winner identifier register 209. The urgent request arbitrator 206 sets the sending-status flag SSF3-7 valid in the sending-status register 207.

Upon reception of the urgent request UQ1, the high-level bus converter 1-0 sends a normal response NP1 in response to the urgent request UQ1 to the intermediate-level bus converter 2-1 through the reserved response entry 103.

Upon reception of the normal request NQ2, the high-level bus converter 1-0 again converts the normal request NQ2 into a retry response RP2 and sends the retry response RP2 to the intermediate-level bus converter 2-1, if the normal response buffer 102 is busy.

Upon reception of the normal response NP1 in the normal response butter 202, the intermediate-level bus converter 2-1 transfers the received normal response NP1 to the low-level bus converter 3-4. At this time, the urgent request arbitrator 206 resets the valid bit in the winner identifier register 209 non valid, and resets the sending-status flag SSF3-4 in the sending-status flag register 207 non valid.

Upon reception of the retry response RP2, the intermediate-level bus converter 2-1 transfers the received retry response RP2 to the low-level bus converter 3-7. At this time, the urgent request arbitrator 206 leaves the valid sending-status flag SSF3-7 in the sending-status flag register 207 as a valid bit.

Upon reception of the normal response NP1, the low-level bus converter 3-4 completes the process of successfully sending a request at this time.

On the other hand, upon reception of the retry response RP2, the low-level bus converter 3-7 converts the retry response RP2 into an urgent request UQ2, and reissues a request as the urgent request UQ2.

When the intermediate-level bus converter 2-1 receives the urgent request UQ2, the urgent request arbitrator 206 determines the urgent request UQ2 as a winner request, because of the facts that the valid bit in the winner identifier register 209 is not valid (there is not any urgent request being in the middle of the process of successfully being executed), that the sending-status flag SSF3-7 is valid, and that the rest of the sending-status flags SSF3-4 to SSF3-6 are not valid. Hence, the intermediate-level bus converter 2-1 directly transfers the urgent request UQ2 to the high-level bus converter 1-0. At this time, the urgent request arbitrator 206 determines the request identifier (ID=3) of the urgent request UQ2 as a winner identifier, stores the identifier in the winner identifier register 209, and sets the valid bit valid in the winner identifier register 20)9. The urgent request arbitrator 206 leaves the sending-status flag SSF3-7 in the sending-status flag register 207 as a valid bit.

Upon reception of the urgent request UQ2, the high-level bus converter 1-0 sends a normal response NP2 in response to the urgent request UQ2 to the intermediate-level bus converter 2-1.

Upon reception of the normal response NP2, the intermediate-level bus converter 2-1 transfers the normal response NP2 to the low-level bus converter 3-7. At this time, the urgent request arbitrator 206 resets the valid bit in the winner identifier register 209 to a non-valid bit. The urgent request arbitrator 206 also resets the sending-status flag SSF3-7 in the sending-status flag register 207 to a non-valid bit.

Upon reception of the normal response NP2, the low-level bus converter 3-7 completes the process of successfully sending a request, at this time.

In the above-described embodiment, the explanations have been made to the data processing apparatus, which employs the livelock avoidance method and comprises the high-level, intermediate-level and low-level bus converters connected with each other in hierarchy, by way of example. However, the present invention can also be adapted to any other data processing apparatus comprising bus converters which are hierarchically arranged in two levels or four levels. In the above-described embodiment, one high-level bus converter, three intermediate-level bus converters and twelve low-level bus converters are included in the data processing apparatus. However, the present invention can also be adapted to any other data processing apparatus comprising an arbitrary number of bus converters in an arbitrary number of levels in the hierarchy.

Various embodiments and changes may be made thereon to without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. H11-321045 filed on Nov. 11, 1999, and including specification, claims, drawings and summary. The disclosure of the above Japanese Patent Application is incorporated herein by reference in its entirety.

What is claimed is:

1. A data processing apparatus comprising at least one high-level bus converter, a plurality of intermediate-level bus converters, and a plurality of low-level bus converters which are connected with one another in hierarchy, wherein:

said at least one high-level bus converter (1) converts, if a normal-response buffer is busy when a normal request is received, the received normal request into a retry response and sends the retry response to one of said plurality of intermediate-level bus converters which has sent the normal request thereto, and (2) sends, when an urgent request is received, a normal response in response to the received urgent request to one of said plurality of intermediate-level bus converters which has sent the urgent request thereto;

each of said plurality of low-level bus converters (1) issues a normal request, and (2) converts, when a retry response is received, the retry response into an urgent request, and reissues a request as the urgent request; and each of said plurality of intermediate-level bus converters arbitrates, when a plurality of urgent requests compete with each other, between the plurality of urgent requests and transfers a winner urgent request to said at least one high-level bus converter, converts at least one looser urgent request into a normal request, and transfers the looser urgent request to said at least one high-level bus converter.

2. The data processing apparatus according to claim 1, wherein:

said at least one high-level bus converter (1) receives a normal request sent from one of said plurality of intermediate-level bus converters in a request buffer, converts the normal request into a retry response if the normal-response buffer is busy, and sends the retry response to the one of said plurality of intermediate-level bus converters through a retry response buffer, (2) sends, when an urgent request is received through the request buffer, a normal response in response to the urgent request to one of said plurality of intermediate-level bus converters through reserved-response entry, and (3) receives a normal response in the normal-response buffer;

each of said plurality of low-level bus converters includes a request buffer, a normal-response buffer, reserved-response entry, and a retry-response buffer, (1) issues a normal request through the request buffer, (2) receives a normal response in the normal-response buffer, (3) receives a retry response in the retry-response buffer, converts the retry response into an urgent request and reissues a request as the urgent request through the request buffer; and each of said plurality of intermediate-level bus converters arbitrates, when a plurality of urgent requests are received in a request buffer so as to compete with each other, between the plurality of urgent requests, transfers a winner urgent request to said at least one high-level bus converter, converts at least one looser urgent request into a normal request, and transfers the normal request to said at least one high-level bus converter.

3. The data processing apparatus according to claim 2, wherein each of said intermediate-level bus converters comprises:

a sending-status flag register store a sending-status flag representing that an urgent request is in a middle of a process of being successfully executed, when the urgent request is transferred as an urgent request or as a normal request;

a request identifier register store a valid bit representing that a request identifier and a conceding request identifier are valid;

a winner identifier register store a valid bit, representing a winner identifier which is a request identifier of an urgent request determined as a winner in an urgent request arbitrator, and representing that the winner identifier is valid; and a priority pointer register storing a priority pointer for determining a winner urgent request when transferring an urgent request.

4. The data processing apparatus according to claim 3, wherein each of said plurality of intermediate-level bus converters includes an urgent request arbitrator which determines a winner urgent request based on the priority pointer stored in the priority pointer register and the sending-status flag stored in the sending-status flag register.

5. The data processing apparatus according to claim 4, wherein each of said plurality of intermediate-level bus converters:

transfers an urgent request to said at least one high-level bus converter, when all of sending-status flags stored in the sending-status flag register are not valid and the valid bit of the winner identifier is not valid, and sets the valid bit of the winner identifier valid;

transfers an urgent request to said at least one high-level bus converter, when the valid bit of the winner identifier is not valid and any one of the sending-status flags stored in the sending-status flag register is valid and when the request identifier coincides with an output of the urgent request arbitrator, and sets the valid bit of the winner identifier valid;

transfers a normal request to said at least one high-level bus converter, when the valid bit of the winner identifier is not valid and any one of the sending-status flags stored in the sending-status flag register is valid and when the request identifier does not coincide with an output of the urgent request arbitrator, and sets the valid bit of the winner identifier valid; and transfers an urgent request, when the valid bit of the winner identifier is valid and when the request identifier coincides with an output of the urgent request arbitrator, and transfers a normal request when the valid bit of the winner identifier is valid and when the request identifier does not coincide with an output of the urgent request arbitrator.

6. A livelock avoidance method, as a data processing method performed by a data processing apparatus comprising a plurality of bus converters connected with each other in hierarchy, said method comprising:

converting, in a bus converter having received a normal request, the normal request into a retry response, when a normal response buffer is busy, and sending the retry response to a bus converter, having issued the normal request, through reserved-response entry;

reissuing a request as an urgent request for requesting an urgent service based on the retry response in the bus converter having issued the normal request; and arbitrating, when a plurality of urgent requests compete with each other in a bus converter arranged in a request path, between the plurality of urgent requests, transferring a winner urgent request to a high-level bus converter, and transferring at least one looser urgent request to the high-level bus converter as a normal request.

7. A method for processing data as performed by a data processing apparatus comprising at least one high-level bus converter, a plurality of intermediate-level bus converters and a plurality of low-level bus converters which are connected with each other in hierarchy, wherein:

said high-level bus converter (1) converts, if a normal-response buffer is busy when a normal request is received, the received normal request into a retry response and sends the retry response to one of said plurality of intermediate-level bus converters which has sent the normal request thereto, and (2) sends, when an urgent request is received, a normal response in response to the received urgent request to one of said plurality of intermediate-level bus converters which has sent the urgent request thereto;

each of said plurality of low-level bus converters (1) issues a normal request, and (2) converts, when a retry response is received, the retry response into an urgent request, and reissues a request as an urgent request; and each of said plurality of intermediate-level bus converters arbitrates, when a plurality of urgent requests compete with each other, between the plurality of urgent requests and transfers a winner urgent request to said high-level bus converter, converts a looser urgent request into a normal request, and transfers the looser urgent request to the high-level bus converter.

8. A data processing apparatus comprising at least one high-level bus converter, a plurality of intermediate-level converters and a plurality of low-level bus converters which are connected With each other in hierarchy, wherein:

said high-level bus converter includes (1) means for converting, if a normal response buffer is busy when a normal request is received, the received normal request into a retry response and sends the retry response to one of said plurality of intermediate-level bus converters which has sent the normal request thereto, and (2) means for sending when an urgent request is received, a normal response in response to the received urgent request to one of said plurality of intermediate-level bus converters which has sent the urgent request thereto;

each of said plurality of low-level bus converters includes (1) means for issuing a normal request, and (2) means for converting, when a retry response is received, the retry response into an urgent request, and reissues a request as an urgent request; and each of said plurality of intermediate-level bus converters includes means for arbitrating, when a plurality of urgent requests compete with each other, between the plurality of urgent requests and transfers a winner urgent request to said high-level bus converter, converts a looser urgent request into a normal request, and transfers the looser urgent request to the high-level bus converter.

9. A bus converter for an intermediate-level in a hierarchy in a data processing apparatus comprising at least one high-level bus converter, a plurality of intermediate-level bus converters and a plurality of low-level bus converters which are connected with each other in the hierarchy, wherein said bus converter receives an urgent request in a request buffer, arbitrates, when a plurality of urgent requests compete with each other, between the plurality of urgent requests and transfers a winner urgent request to said high-level bus converter, transfers at least one looser urgent request into a normal request, and transfers the normal request to said high-level bus converter.

* * * * *